VOICE BANDWIDTH REDUCTION TRANSMISSION SYSTEM

Filed Aug. 9, 1960

INVENTOR.
GEORGE A. FRANCO
BY George J. Seligsohn
ATTORNEY

United States Patent Office 3,116,374

Patented Dec. 31, 1963

3,116,374

VOICE BANDWIDTH REDUCTION TRANSMISSION SYSTEM

George A. Franco, Pittsford, N.Y., assignor to General Dynamics Corporation, Rochester, N.Y., a corporation of Delaware Filed Aug. 9, 1960, Ser. No. 48,431
8 Claims. (Cl. 179—15.55)

This invention relates to a bandwidth reduction transmission system for information characterized by a maximum syllabic rate and, more particularly, to a narrow bandwidth system for transmitting speech.

The speech spectrum at any given time may extend from 300 cycles to 3 kilocycles. Furthermore, speech is characterized by a syllabic rate, i.e., a particular spectrum is present for a given period of time (for normal speech, this time period is less than 40 milliseconds). Therefore, sampling a speech spectrum at time intervals of 20 milliseconds is sufficient to describe the spectrum in time.

Broadly, the present invention contemplates separating the frequency components of a speech component into a given number of contiguous equal bandwidth channels by means of filters. Each of the bandwidth channels above the lowest bandwidth channel may then be heterodyned down to a frequency identical with the lowest bandwidth channel. The outputs of the respective channels may be sequentially sampled periodically at a frequency which is higher than the syllabic rate, and the resulting time multiplexed signals transmitted to a receiver over a transmission medium having a frequency bandwidth equal to the frequency bandwidth of the lowest bandwidth channel. At the receiver, the original speech may be synthesized.

It is, therefore, an object of the present invention to provide a transmission bandwidth reduction system.

It is a further object of the present invention to provide a system for reducing the bandwidth needed to transmit information, such as speech, characterized by a given syllabic rate.

Other objects, features and advantages of the present invention will become apparent from the following detailed description taken together with the accompanying drawings, in which.

Figure 1:
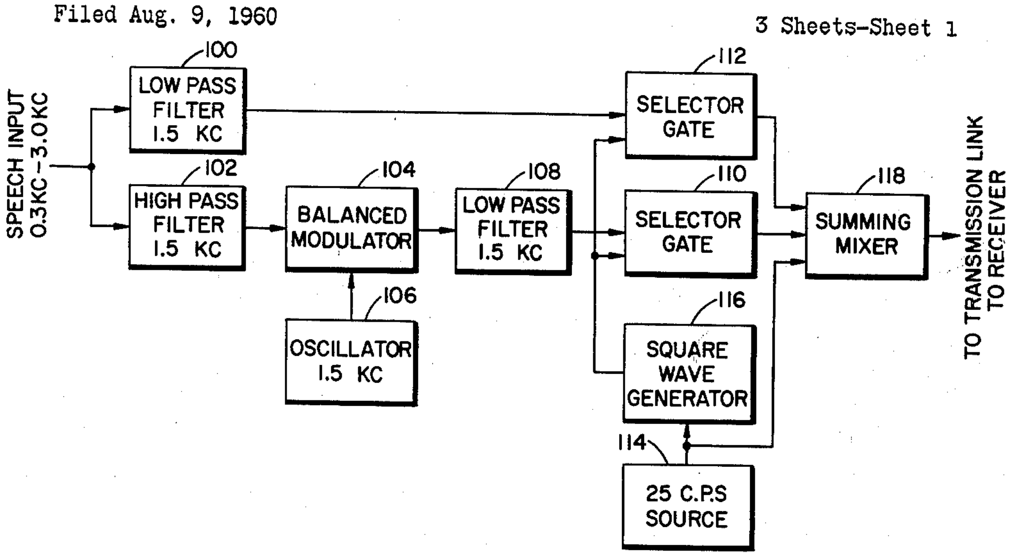
FIG. 1 is a block diagram of the transmitter portion of a specific embodiment of the invention for providing a 2:1 reduction in bandwidth of speech.

Referring now to FIG. 1, a speech input, which may have a frequency spectrum extending from 0.3 kc. to 3.0 kc., is applied in parallel to the respective inputs of 1.5 kc. lowpass filter 100 and 1.5 kc. high pass filter 102.

The output of high pass filter 102 is applied as a first input to balanced modulator 104. The sinusoidal output from 1.5 kc. oscillator 106 is applied as a second input to balanced modulator 104.

The output from balanced modulator 104 is passed through 1.5 kc. low pass filter 108 and applied as a first input to selector gate 110.

The output from low pass filter 100 is applied directly as a first input to selector gate 112.

The sinusoidal output from 25 c.p.s. source 114 is applied as an input to square wave generator 116. The output from square wave generator 116 is applied in parallel as a second input to both selector gates 110 and 112. Selector gate 110 is open only in response to the second input applied thereto having a given polarity, while selector gate 112 is open only in response to the second input applied thereto having a polarity opposite to the given polarity.

The output from selector gate 112 is applied as a first input to summing mixer 118. The output from selector gate 110 is applied as a second input to summing mixer 118. The sinusoidal output from 25 c.p.s. source 114 is applied as a third input to summing mixer 118.

Figure 2:
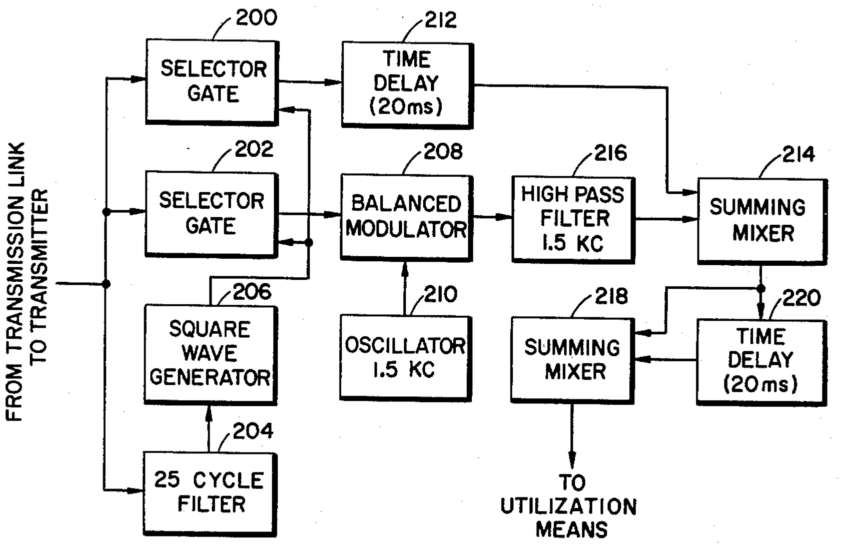
FIG. 2 shows a block diagram of the receiver portion of the specific embodiment of the invention for providing a 2:1 reduction in bandwidth of speech.

The output from summing mixer 118 is applied to a transmission link (not shown) to the receiver, shown in FIG 2. The transmission link may be either a wire link, such as a telephone line, or a radio link.

Referring now to FIG. 2, the information received from the transmitter over the transmission link is applied in parallel as a first input to selector gate 200, a first input to selector gate 202, and as an input to 25 c.p.s. filter 204.

The output from 25 c.p.s. filter 204 is applied as an input to square wave generator 206. The output from square wave generator 206 is applied in parallel as a second input to selector gates 200 and 202. Selector gate 202 is open only in response to the second input applied thereto having the aforesaid given polarity and selector gate 200 is open only in response to the second input applied thereto having a polarity opposite to this given polarity.

The output from selector gate 202 is applied as a first input to balanced modulator 208. The sinusoidal output from 1.5 kc. oscillator 210 is applied as a second input to balanced modulator 208.

The output from selector gate 200 is applied through 20 millisecond time delay means 212, which may be a delay line, as a first input to summing mixer 214.

The output from balanced modulator 208 is applied through 1.5 kc. high pass filter 216 as a second input to summing mixer 214.

The output from summing mixer 214 is applied directly as a first input to summing mixer 218 and is applied through 20 millisecond time delay means 220, which may be a delay line, as a second input to summing mixer 218. The output of summing mixer 218 is applied to utilization means, not shown.

Referring now to the operation of the transmitter, shown in FIG. 1, and the receiver, shown in FIG. 2, 1.5 kc. low pass filter 100 passes those frequency components of the frequency spectrum of the speech input which are lower than 1.5, while high pass filter 102 passes those frequency components of the frequency spectrum of the speech input which are higher than 1.5 kc.

Therefore, the frequency spectrum of the speech input is broken up into lower and upper contiguous bandwidth channels, the lower bandwidth channel including the portion of the frequency spectrum of the speech input between 0.3 kc. and 1.5 kc. and the upper bandwidth channel including the portion of the frequency spectrum of the speech input between 1.5 kc. and 3.0 kc.

Balanced modulator 104 hererodynes the frequency components of the upper bandwidth channel with the 1.5 kc. sinusoidal signal from oscillator 106. Each of the frequency components in the upper bandwidth channel will therefore appear reduced by 1.5 kc. in the lower sideband output of balanced modulator 104. Since the original frequencies of the components of the upper bandwidth channel are between 1.5 and 3.0 kc., the lower sideband will not include any frequency greater than 1.5 kc. Therefore, the lower sideband output from balanced modulator 104 will be passed through 1.5 kc. low pass filter 108 to the first input of selector gate 110.

The lower bandwidth channel, which also does not include any frequency higher than 1.5 kc., as shown, is applied directly as the first input to selector gate 112.

The 25 c.p.s. output applied from source 114 to square wave generator 116 will result in a 25 c.p.s. square wave being applied as a second input to selector gates 110 and 112. Alternate half cycles of the 25 c.p.s. square wave, each of which has a duration of 20 milliseconds, will have the aforesaid given polarity and the remaining half cycles of the 25 c.p.s. square wave, each of which also has a duration of 20 milliseconds, will have a polarity opposite to this given polarity. Therefore, each of selector gates 110 and 112 will be alternately opened for periods of 20 milliseconds.

The alternate 20 millisecond outputs of selector gates 110 and 112, along with a 25 c.p.s. synchronizing signal from source 114, are combined in summing mixer 118 and then transmitted to the receiver over a transmission link. Since the 25 c.p.s. synchronizing signal is below 1.5 kc., the output from selector gate 112 is below 1.5 kc., and the output from selector gate 110 has been reduced to below 1.5 kc. by balanced modulator 104, the bandwidth of the transmission link need only be 1.5 kc., although the frequency spectrum of the original speech extends up to 3.0 kc. Thus, a 2:1 reduction in bandwidth has been achieved.

At the receiver, the 25 c.p.s. synchronizing signal is segregated by filter 204 and applied to square wave generator 206. The square wave from square wave generator 206, which is applied as second inputs to selector gates 200 and 202, causes each of selector gates 200 and 202 to be alternately opened for 20 millisecond periods, which are phased properly with respect to the alternate openings of selector gates 110 and 112 so that the lower bandwidth channel output from selector gate 112, as received at the receiver, will only be passed by selector gate 200 and the upper bandwidth channel output from selector gate 110 will only be passed by selector gate 202.

Oscillator 210, balanced modulator 208 and 1.5 kc. high pass filter 216 cooperate to restore the reduced frequency components of the upper bandwidth channel to their respective original frequencies.

Since the outputs from selector gates 200 and 202 occur alternately for 20 millisecond periods, 20 millisecond time delay means 212 brings each 20 millisecond output from selector gate 200 into time coincidence with the next occurring 20 millisecond output from selector gate 202.

It will be seen that summing mixer 214 recombines the frequency components of the lower and upper bandwidth channels. However, summing mixer 214 will provide an output only during each alternate 20 millisecond period during which selector gate 202 is opened. In order to provide a continuous signal output, the output from summing mixer 214 is applied directly as one input to summing mixer 218 and is also applied as a second input to summing mixer 218 after being delayed 20 milliseconds. Thus, the frequency spectrum of the output from summing mixer 218 will be substantially identical to the original speech input. The output from summing mixer 218 is then applied to utilization means, not shown.

From the foregoing description of FIGS. 1 and 2, it will be seen that a speech signal may be transmitted over a frequency bandwidth only half as wide as the frequency spectrum of the speech being transmitted. By utilizing a more generalized system, the reduction in bandwidth necessary to transmit speech, or other information having a syllabic rate, may be made even greater than 2:1. Such a generalized system is shown in FIGS. 3 and 4.

Figure 3:
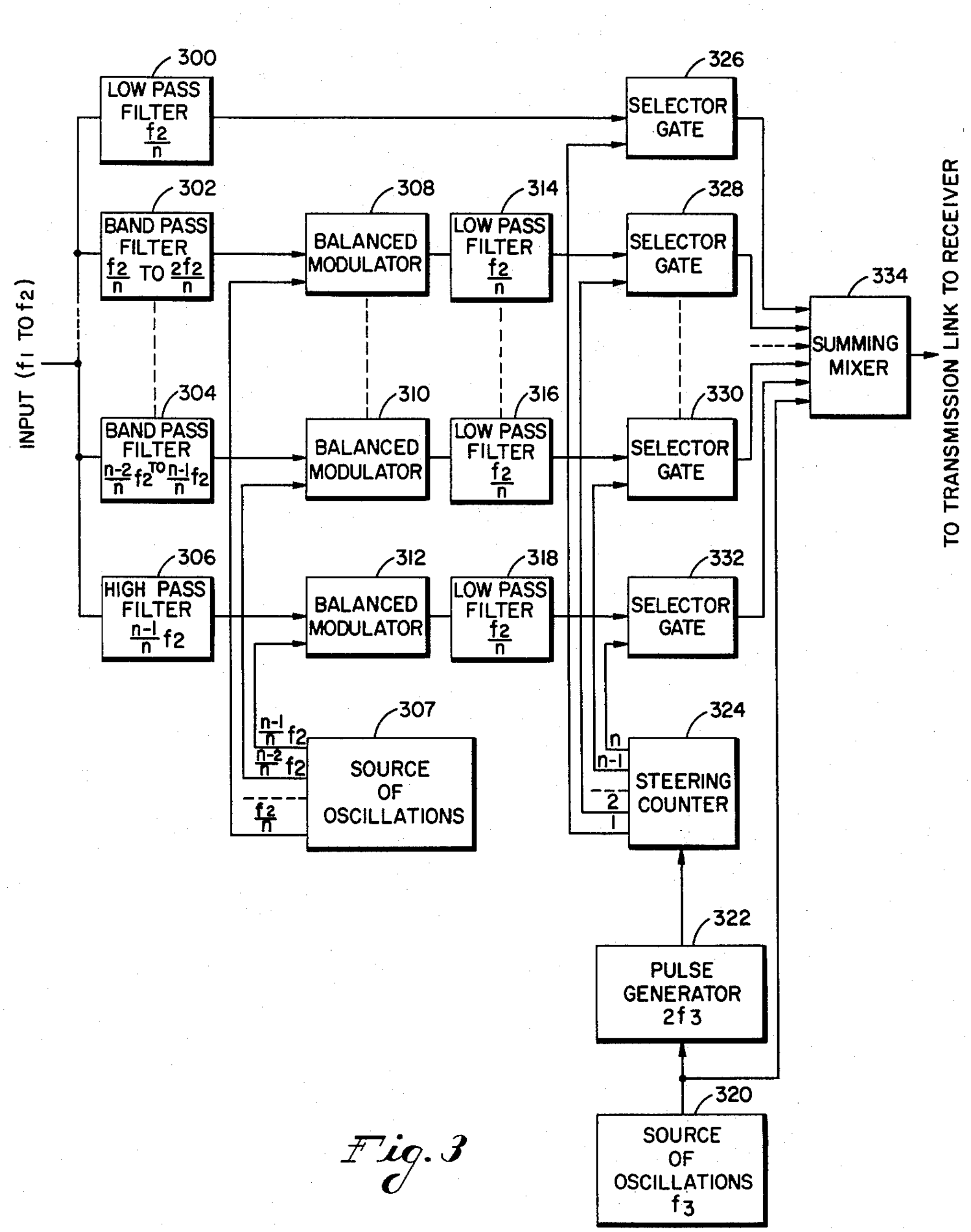
FIG. 3 is a block diagram of the transmitter portion of a generalized embodiment of the invention.
Figure 4:
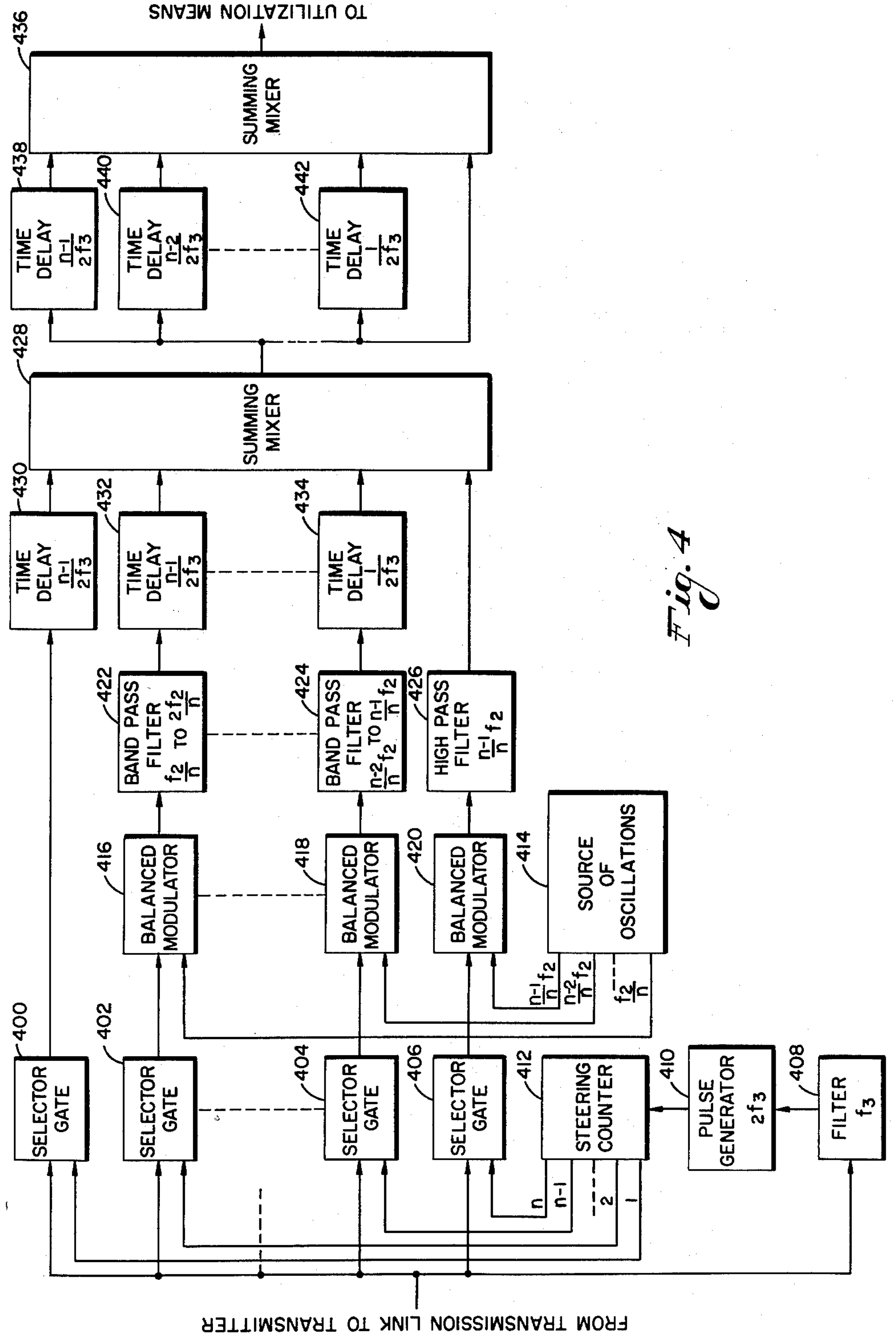
FIG. 4 is a block diagram of the receiver portion of the generalized embodiment of the invention.

Referring now to FIG. 3, information having a given syllabic rate and having a frequency spectrum between $f_1$ and $f_2$ is applied in parallel as inputs to a group of $n$ filters, which includes low pass filter 300 for passing that portion of the input frequency spectrum below $f_2/n$, bandpass filter 302 for passing a portion of the input frequency spectrum between $f_2/n$ and $2f_2/n$, followed by other bandpass filters, not shown, passing frequency bands between $2f_2/n$ and $3f_2/n$, $3f_2/n$ and $4f_2/n$, etc., until bandpass filter 304, which passes the portion of the input frequency spectrum between $$\frac{n-2}{n}f_2$$

and $$\frac{n-1}{n}f_2$$

The portion of the input frequency spectrum above $$\frac{n-1}{n}f_2$$

is passed by high pass filter 306.

A source of oscillation 302 provides on separate output conductors a sinusoidal output signal at a frequency $f_2/n$ and each of the harmonics of $f_2/n$, as shown, up to $$\frac{n-1}{n}f_2$$

Each of the filters, other than low pass filter 300, has associated therewith an individual balanced modulator, such as balanced modulators 308, 310, and 312. Thus, the output from bandpass filter 302 is applied as a first input to balanced modulator 308, the output from bandpass filter 304 is applied as an input to balanced modulator 310 and the output from high pass filter is applied as a first input to balanced modulator 312.

Frequency $f_2/n$ from source of oscillations 307 is applied as a second input to balanced modulator 308. In a similar manner, frequency $2f_2/n$ (not shown) is applied as a second input to an associated balanced modulator, etc., frequency $$\frac{n-2}{n}f_2$$

is applied as a second input to balanced modulator 310, and frequency $$\frac{n-1}{n}f_2$$

is applied as a second input to balanced modulator 312.

Each of the balanced modulators, such as balanced modulators 308, 310, and 312, is followed by an individual low pass filter, such as low pass filters 314, 316, and 318, each of which passes all frequencies lower than frequency $f_2/n$.

It will be seen that source of oscillations 307, the group of balanced modulators, such as balanced modulators 308, 310, 312, and the group of low pass filters, such as low pass filters 314, 316, and 318, cooperate to reduce the frequency components in each channel to a frequency no greater than $f_2/n$.

Source of oscillations 320 produces a sinusoidal output at frequency $f_3$. The output from source of oscillations 320 is applied to pulse generator 322, which produces a short pulse at each zero crossing of frequency $f_3$. Therefore, the pulse repetition rate of the pulses appearing on the output of pulse generator 322 is $2f_3$, since a zero crossing of $f_3$ occurs each half cycle. The output pulses from pulse generator 322 are applied as an input to steering counter 324, which may be a ring-connected counter, for sequentially producing an individual potential marking on each of $n$ output conductors emanating from steering counter 324. Thus, in response to a first pulse, a potential marking will appear only on the first output conductor of steering counter 324, in response to the second pulse a potential marking will appear only on the second output conductor of steering counter 324 . . . in response to the $n$ pulse a potential marking will appear only on the $n$ output conductor of steering counter 324, and in response to the $n+1$ pulse a potential marking will again appear only on the first output conductor of steering counter 324, etc.

The output from low pass filter 300 is applied as a first input to selector gate 326. As shown, the respective outputs from each of the group of low pass filters, such as low pass filters 314, 316, and 318, is applied individually as a first input to each of a group of selector gates, such as selector gates 328, 330, and 332.

The first output conductor of steering counter 324 is connected as a second input to selector gate 326, the second output conductor of steering counter 324 is connected as a second input to selector gate 328 . . . the $n-1$ output conductor of steering counter 324 is connected as a second input to selector gate 330, and the $n$ output conductor of steering counter 324 is connected as a second input to selector gate 332.

Each of the selector gates, 326, 328 . . . 330 and 332, is opened only when a potential marking is present on the particular output conductor from steering counter 324, which is connected as a second input thereto. Thus, each of the selector gates will be sequentially opened for a period equal to $1/2f_3$ seconds and then will remain closed for a period of $n-1/2f_3$ seconds before it is opened again.

The respective time multiplexed outputs from selector gates 326, 328 . . . 330, and 332, are applied as respective inputs to summing mixer 334. Also, a synchronizing signal from source of oscillations 320 is applied as an additional input to summing mixer 334. The output from summing mixer 334 is applied to a transmission link (not shown) to the receiver.

Referring now to FIG. 4, at the receiver the information received over the transmission link from the transmitter is applied as a first input to each of a group of selector gates, such as selector gates 400, 402 . . . 404, and 406. The received information is also applied as an input to filter 408, which is tuned to frequency $f_3$.

The output from filter 408 is applied as an input to pulse generator 410, which produces a short pulse in response to each zero crossing of frequency $f_3$ Therefore, the pulse repetition rate of the pulses appearing on the output of pulse generator 410 will be $2f_3$, since a zero crossing occurs each half cycle of frequency $f_3$ The output from pulse generator 410 is applied as an input to steering counter 412, which may be a ring-connected counter identical to steering counter 324. Thus, steering counter 412 periodically applies sequential potential markings to each of its respective $n$ output conductors. The first output conductor of steering counter 412 is connected as a second input to selector gate 400, the second output from steering counter 412 is connected as a second input to selector gate 402 . . . the $n-1$ output conductor of steering counter 412 is connected as a second input to selector gate 404, and the $n$-output conductor of selector gate 412 is connected as a second input to selector gate 406.

In this manner, the opening of each of selector gates 400, 402, . . . 404, and 406, respectively, is synchronized in time with the opening of each of selector gates 326, 328 . . . 330 and 332, respectively, at the transmitter. Thus, the information appearing in the output of selector gate 400 corresponds to the information emanating from selector gate 326, the information appearing in the output of selector gate 402 corresponds to the information emanating from selector gate 328 . . . the information appearing in the output of selector gate 404 corresponds to the information emanating from selector gate 330, and the information appearing in the output of selector gate 406 corresponds to the information emanating from selector gate 332.

As shown, source of oscillations 414 together with the group of balanced modulators, such as balanced modulators 416 . . . 418 and 420, together with the group of filters, such as bandpass filters 422 . . . 424 and high pass filter 426, serve to restore the frequency-reduced frequency components in each of the bandwidth channels to their respective original frequencies in the input to the transmitter.

The output from selector gate 400 is applied as a first input to summing mixer 428 through time delay means 430, which provides a time delay of $n-1/2f_3$ seconds. The output from bandpass filter 422 is applied as a second input to summing mixer 428 through time delay means 432 which provides a time delay of $n-2/2f_3$ seconds. In a similar manner, each of the outputs of the successive bandpass filters (not shown) is applied as an input to summing mixer 328 through a time delay means (not shown) providing a time delay $1/2f_3$ seconds less than the time delay means associated with the preceding bandwidth channel. Therefore, the output of bandpass filter 424 is applied as the penultimate input to summing mixer 428 through time delay means 434, which provides a time delay of $1/2f_3$ seconds and the output from high pass filter 426 is applied directly as the last input to summing mixer 428.

The group of time delay means, such as time delay means 430, 432 and 434, serves to bring the staggered time multiplexed outputs of the several selector gates into time coincidence. Therefore, at the input to summing mixer 428 there will be a simultaneous input thereto from all the bandwidth channels for a period of $1/2f_3$ seconds followed by a zero input thereto for the following period of $n-1/2f_3$ seconds.

The several bandwidth channels are combined by summing mixer 428, and the output from summing mixer 428 is applied in parallel directly as a first input to summing mixer 436 and through a group of time delay means, such as time delay means 438, which provides a time delay of $n-1/2f_3$ seconds, time delay means 440, which provides a time delay of $n-2/2f_3$ seconds . . . and time delay means 442 which provides a time delay of $\frac{1}{2}f_3$ seconds, as separate additional inputs to summing mixer 436. Summing mixer 436 combines these inputs into a single continuous output which is applied to utilization means, not shown. The continuous output from summing mixer 436 is substantially identical to the original input signal to the transmitter.

It will be seen that the generalized embodiment of the invention shown in FIGS. 3 and 4 operate in essentially the same manner as the previously described specific embodiment of the invention shown in FIGS. 1 and 2, except that in the generalized embodiment of the invention, the transmission band is reduced by a factor of $n:1$, rather than only 2:1.

In the generalized embodiment of the invention, there are certain limitations on the maximum value of $n$ and the frequency of $f_3$ of the synchronizing signal, which controls the sampling rate, which will now be explained.

In order that no substantial amount of information be lost, it is necessary that each bandwidth channel be sampled at least once during each syllabic period. Thus, if the syllabic information is speech, each bandwidth channel must be sampled once every 40 milliseconds, i.e., the syllabic rate must be no lower than 25 c.p.s. Since each bandwidth channel is sequentially sampled, and there are $n$ bandwidth channels, the maximum period during which each bandwidth channel may be sampled is equal to the syllabic period divided by $n$. It will be seen that in the generalized embodiment, each bandwidth channel is sampled for a period of $1/2f_3$ seconds.

Therefore, $$\frac{1}{2f_3}=\frac{\text{syllabic period}}{n}$$

or $$2f_3=\frac{n}{\text{syllabic period}}$$

Since the syllabic period is constant for any type of syllabic information, being 40 milliseconds for speech information, it will be seen from the above relationship between $f_3$, $n$ and the syllabic period that the greater the value of $n$, the greater will be the required frequency of $f_3$. However, it is also essential that the sampling period be longer than the period of the lowest frequency in the frequency spectrum of the applied syllabic input information, i.e., frequency $f_1$, which is 300 c.p.s. in the case of speech information. This limits the maximum value $n$, the number of bandwidth channels which may be utilized.

Thus, $$f_1 \geqq 2f_3 \geqq \frac{n}{\text{syllabic period}}$$

In the case of speech information, where $f_1=300$ c.p.s. and the syllabic period is 40 milliseconds, the maximum possible $n$ is 12 at which $f_3$ is equal to 150 c.p.s. Thus, with speech information, it is possible to achieve a maximum reduction in transmission bandwidth of as much as 12:1.

Although only certain embodiments of the present invention have been shown and described herein, it is not intended that the invention be restricted thereto, but that it be limited only by the true spirit and scope of the appended claims.

What is claimed is:

1. A system for reducing the bandwidth needed to transmit an information signal having a frequency spectrum ranging from a given low frequency to a given high frequency and having a given minimum syllabic period, said system comprising a transmitter including filter means having said information signal applied as an input thereto for dividing the frequency spectrum thereof into a given number of separate contiguous frequency bandwidth channels, the lowest of said channels passing all frequencies up to a given intermediate frequency which is between said given low and high frequencies and each of said other channels having a respective frequency bandwidth no greater than said given intermediate frequency, heterodyne means coupled to said filter means and associated with each of said other channels for reducing the frequency of the components of each respective other channel to a frequency no greater than said given intermediate frequency, and cyclically-operated sampling means coupled to said filter means and said heterodyne means for repeatedly sampling in sequence for a given sampling period said lowest frequency channel and each of said frequency-reduced other channels, said given sampling period being at least equal to a period of said given low frequency and said number of channels being small enough to permit all of said channels to be sampled at least once during a syllabic period of said information signal.

2. The system defined in claim 1, wherein said sampling means produces a synchronizing signal manifesting the initiation of each sequential sampling period, wherein said transmitter includes combining means coupled to said sampling means for combining said synchronizing signal and each of said samples into a single signal, and wherein said system further includes a receiver linked to said combining means of said transmitter for receiving said single signal, said receiver including second cyclically-operated sampling means having said single signal applied thereto and synchronized by said synchronizing signal for separating said samples into said given number of receiver channels which correspond to those of said transmitter, second heterodyne means coupled to said second sampling means and associated with each of said receiver channels corresponding to said other channels of said transmitter for increasing the frequency of the components of each respective other receiver channel to their original frequency in the frequency spectrum of said information signal, and time delay and summing means coupled to said second sampling means and said heterodyne means for deriving a continuous signal having substantially the same frequency spectrum as said information signal.

3. The system defined in claim 2, wherein said time delay and summing means includes first time delay means coupled to said second sampling means for bringing all said samples into time coincidence with one of said samples, summing means coupled to said second sampling means and said first time delay means for combining said time coincident samples, second time delay means coupled to said first summing means for bringing said combined samples into time coincidence with the time of occurrence of each other sample, and second summing means coupled to said first summing means and said second time delay means for combining the combined samples in time coincidence with each of said respective samples.

4. The system defined in claim 2, wherein each of said first-mentioned and second sampling means includes an oscillator operating at a frequency which is harmonically related to said sampling period, a pulse generator coupled to said oscillator for generating pulses occurring at a repetition period equal to said sampling period, a cyclically-operated steering counter coupled to said pulse generator for repeatedly counting pulses applied thereto up to a number equal to said given number, individual normally closed gates associated respectively with each of said channels all of which gates are coupled to said steering counter for opening each gate in sequence in accordance with the count manifested by said steering counter.

5. The system defined in claim 4, wherein said synchronizing signal is derived from said oscillator of said first-mentioned sampling means and said oscillator of said second sampling means is phase locked by said synchronizing signal being applied thereto.

6. The system defined in claim 1, wherein said intermediate frequency is equal to said given high frequency divided by said given number.

7. The system defined in claim 6, wherein the bandwidth of the portion of the frequency spectrum passed by each of said other channels is equal to said given high frequency divided by said given number.

8. The system defined in claim 1, wherein said predetermined number of channels is two, and said filter means includes a low pass filter passing only all frequencies no greater than one-half said given high frequency and a high pass filter passing only all frequencies no less than one-half said given high frequency.

References Cited in the file of this patent

UNITED STATES PATENTS

| | | |
|---|---|---|
| 2,098,956 | Dudley | Nov. 16, 1937 |
| 2,213,320 | Mathes et al. | Sept. 3, 1940 |
| 2,402,059 | Craib | June 11, 1946 |